United States Patent
Loos et al.

(10) Patent No.: US 8,546,472 B2
(45) Date of Patent: Oct. 1, 2013

(54) POLYESTERS BASED ON 2-METHYLSUCCINIC ACID

(75) Inventors: Robert Loos, Ludwigshafen (DE); Darijo Mijolovic, Mannheim (DE); Jens Heimann, Worms (DE); Zsolt Jozsef Szarka, Limburgerhof (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/423,403

(22) Filed: Mar. 19, 2012

(65) Prior Publication Data

US 2012/0245256 A1    Sep. 27, 2012

Related U.S. Application Data

(60) Provisional application No. 61/466,478, filed on Mar. 23, 2011.

(51) Int. Cl.
*C08L 3/02*    (2006.01)
*C08L 89/00*   (2006.01)

(52) U.S. Cl.
USPC ............. 524/17; 524/47; 524/29; 524/605; 525/444; 525/437

(58) Field of Classification Search
USPC ............. 524/17, 47, 29, 605; 525/444, 437
See application file for complete search history.

(56) References Cited

U.S. PATENT DOCUMENTS

| | | | |
|---|---|---|---|
| 5,817,721 A | 10/1998 | Warzelhan et al. | |
| 5,863,991 A | 1/1999 | Warzelhan et al. | |
| 5,874,486 A | 2/1999 | Bastioli et al. | |
| 5,880,220 A | 3/1999 | Warzelhan et al. | |
| 5,889,135 A | 3/1999 | Warzelhan et al. | |
| 6,018,004 A | 1/2000 | Warzelhan et al. | |
| 6,111,058 A | 8/2000 | Warzelhan et al. | |
| 6,120,895 A | 9/2000 | Kowitz et al. | |
| 6,258,924 B1 | 7/2001 | Warzelhan et al. | |
| 2011/0034662 A1 | 2/2011 | Witt et al. | |
| 2011/0039999 A1 | 2/2011 | Witt et al. | |
| 2011/0300389 A1* | 12/2011 | Kitagawa et al. | 428/423.1 |

FOREIGN PATENT DOCUMENTS

| | | |
|---|---|---|
| CN | 1861660 A | 11/2006 |
| EP | 488617 A2 | 6/1992 |
| EP | 539541 A1 | 5/1993 |
| EP | 575349 A1 | 12/1993 |
| EP | 652910 A1 | 5/1995 |
| EP | 0736557 A1 | 10/1996 |
| WO | WO-92/09654 A2 | 6/1992 |
| WO | WO-9214782 A1 | 9/1992 |
| WO | WO-92/19680 A1 | 11/1992 |
| WO | WO-9615173 A1 | 5/1996 |
| WO | WO-9615174 A1 | 5/1996 |
| WO | WO-9615175 A1 | 5/1996 |
| WO | WO-9615176 A1 | 5/1996 |
| WO | WO-96/21689 A2 | 7/1996 |
| WO | WO-9621690 A1 | 7/1996 |
| WO | WO-9621691 A1 | 7/1996 |
| WO | WO-9621692 A1 | 7/1996 |
| WO | WO-96/25448 A1 | 8/1996 |
| WO | WO-9625446 A1 | 8/1996 |
| WO | WO-9812242 A1 | 3/1998 |
| WO | WO-2006/097353 A1 | 9/2006 |
| WO | WO-2006/097354 A1 | 9/2006 |
| WO | WO-2006/097355 A1 | 9/2006 |
| WO | WO 2006/097355 A1 * | 9/2006 |
| WO | WO-2006/097356 A1 | 9/2006 |
| WO | WO-2009/127556 A1 | 10/2009 |
| WO | WO-2009127555 A1 | 10/2009 |

OTHER PUBLICATIONS

Chae et al., "Effect of Methyl Substitution of the Ethylene Unit on the Physical Properties of Poly (butylene succinate)", *Journal of Polymer Science*, vol. 42, pp. 1759-1766 (2004).

Park et al., "Crystallization behavior of poly(butylene succinate) copolymers", *Polym Int*, vol. 51, pp. 239-244 (2002).

Witt et al., "Evaluation of the Biodegradability of Copolyesters Containing Aromatic Compounds by Investigations of Model Oligomers", *Journal of Enviornmental Polymer Degradation*, vol. 4, No. 1, pp. 9-20 (1996).

* cited by examiner

*Primary Examiner* — Robert D. Harlan
(74) *Attorney, Agent, or Firm* — Novak Druce Connolly Bove + Quigg LLP

(57) ABSTRACT

The present invention relates to a polyester comprising repeat units based on at least one aliphatic dicarboxylic acid or an ester-forming derivative thereof (component A1), at least one aromatic dicarboxylic acid or an ester-forming derivative thereof (component A2), at least one diol (component B), optionally at least one sulfo-containing compound (component A3) and optionally at least one trifunctional crosslinking agent as component C1 and/or at least one difunctional chain extender as component C2, component A1 comprising 2-methylsuccinic acid or an ester-forming derivative thereof, to a process for preparing the inventive polyester, to the mixtures comprising the inventive polyester, to the use of the inventive polyesters or of the inventive mixtures for production of moldings, films, adhesives, foams or fibers, and to moldings, films, adhesives, foams or fibers comprising at least one inventive polyester or at least one inventive mixture.

15 Claims, No Drawings

POLYESTERS BASED ON 2-METHYLSUCCINIC ACID

CROSS-REFERENCE TO RELATED APPLICATIONS

This application claims benefit under 35 U.S.C. §119(e) of U.S. Provisional Patent App. Ser. No. 61/466,478, filed Mar. 23, 2011, which is incorporated herein by reference in its entirety.

The present invention relates to a polyester comprising repeat units based on at least one aliphatic dicarboxylic acid or an ester-forming derivative thereof (component A1), at least one aromatic dicarboxylic acid or an ester-forming derivative thereof (component A2), at least one diol (component B), optionally at least one sulfo-containing compound (component A3) and optionally at least one trifunctional crosslinking agent as component C1 and/or at least one difunctional chain extender as component C2, component A1 comprising 2-methylsuccinic acid or an ester-forming derivative thereof, to a process for preparing the inventive polyester, to the mixtures comprising the inventive polyester, to the use of the inventive polyesters or of the inventive mixtures for production of moldings, films, adhesives, foams or fibers, and to moldings, films, adhesives, foams or fibers comprising at least one inventive polyester or at least one inventive mixture.

Biodegradable, purely aliphatic polyesters based on 2-methylsuccinic acid as a comonomer are known in the prior art.

CN 1861660 discloses biodegradable aliphatic copolyesters based on succinic acid and butanediol. In addition to succinic acid, the copolyesters are based on a further aliphatic dicarboxylic aid, and adipic acid, methylsuccinic acid, benzylsuccinic acid and 2,2-dimethylsuccinic acid are specified. In addition to butanediol, the diols used may be ethylene glycol, propylene glycol or hexanediol. Example 2 mentions a copolyester formed from succinic acid, butanediol and methylsuccinic acid (PBSM).

Chae et al., Journal of Polymer Science Part B: Polymer Physics, Vol. 42, No. 9, 1759-1766, 2004 relates to a study concerning the effect of the methyl substitution of the ethylene unit of poly(butylenesuccinic acid) on the physical properties of the polymers. The addition of 2-methylsuccinic acid can slow the crystallization rate. According to Chae et al., the addition of 2-methylsuccinic acid in the preparation of an aliphatic copolyester formed from succinic acid and butanediol leads to improved regulability of the balance of biodegradability and physical properties. However, the effect of adding too much 2-methylsuccinic acid is a deterioration in the physical properties and processability in the melt.

Park et al., Polym. Int. 51: 239-244 (2002) discloses a study of the crystallization characteristics of poly(butylenesuccinic acid-co-butylene-2-methylenesuccinic acid) (PBSMS) with various comonomer ratios. According to Park et al., the equilibrium melting temperature decreases significantly with increasing concentration of 2-methylsuccinic acid.

Biodegradable aliphatic-aromatic polyesters which are obtainable by reaction of dicarboxylic acids with dialcohols are likewise known in the prior art. The presence of the aromatic component in the polyester is essential to obtain polymers with sufficiently high melting points and adequate crystallization rates.

For instance, EP 0 736 557 A1 relates to aliphatic-aromatic copolyesters comprising repeat units of the following structures,

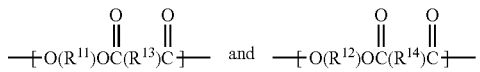

in which
$R^{11}$ and $R^{12}$ are identical and are each selected from the group consisting of $C_2$-$C_8$-alkylene or oxyalkylene, in which $R^{11}$ and $R^{12}$ are 100% based on the diol component;
$R^{13}$ is selected from one or more elements of the group consisting of $C_0$-$C_8$-alkylene or $C_2$-$C_4$-oxyalkylene, in which $R^{13}$ is based on 35 to 95 mol % of dicarboxylic acid components; and
$R^{14}$ is selected from the group consisting of $C_6$-$C_{10}$-aryl, where 5 to 65 mol % of $R^{14}$ is based on the dicarboxylic component.

The following copolyesters are mentioned as suitable copolyesters: (1) glutaric acid (30 to 35%), diglycolic acid (0 to 10 mol %), terephthalic acid (25 to 60%), 1,4-butanediol (100 mol %); (2) succinic acid (30 to 85%), diglycolic acid (0 to 10%); terephthalic acid (5 to 60%), 1,4-butanediol (100 mol %); (3) adipic acid (30 to 65%), diglycolic acid (0 to 10%), terephthalic acid (25 to 60%), 1,4-butanediol (100 mol %).

WO 2006/097354 A1 discloses biodegradable aliphatic/aromatic copolyesters which comprise 49 to 66 mol % of an aromatic polyfunctional acid, 51 to 34 mol % of an aliphatic acid of which at least 70% is sebacic acid; and butanediol, and mixtures comprising these copolyesters.

Biodegradable aliphatic/aromatic copolyesters based on 2-methylsuccinic acid as a comonomer have not been described to date in the prior art.

In addition to biodegradability, an essential criterion of the aliphatic/aromatic copolyesters is hydrolysis stability, in order that the use of the aliphatic/aromatic copolyesters and blends and end products based thereon is ensured within a very wide range of applications.

It is therefore an object of the present application, with respect to the prior art, to provide biodegradable aliphatic/aromatic copolyesters which are notable for improved hydrolysis stability with a simultaneously high proportion of biobased monomers.

This object is achieved by polyesters comprising repeat units based on
a) at least one aliphatic dicarboxylic acid and/or an ester-forming derivative thereof as component A1,
b) at least one aromatic dicarboxylic acid and/or an ester-forming derivative thereof as component A2,
c) at least one diol as component B,
d) optionally at least one sulfo-containing compound as component A3,
e) optionally at least one tri- or polyfunctional crosslinking agent as component C1 and/or at least one di- or polyfunctional chain extender as component C2.

The characterizing feature of the inventive polyesters is that component A1 comprises 2-methylsuccinic acid and/or an ester-forming derivative thereof.

It has been found that, surprisingly, aliphatic/aromatic copolyesters comprising repeat units based on 2-methylsuccinic acid and/or ester-forming derivatives thereof are notable for an improved hydrolysis stability compared to aliphatic/aromatic copolyesters comprising, for example, succinic acid alone. In addition, it has been found that, surprisingly, the aromatic/aliphatic copolyesters, in contrast to the purely aliphatic polyesters known from the literature, crystallize sufficiently rapidly at higher 2-methylsuccinic acid contents. They can thus be used in standard processing operations.

The inventive aliphatic/aromatic copolyesters are biodegradable and can be prepared essentially from known and inexpensive monomer units. In addition, it is possible to provide tailored products for numerous different applications by specific modifications, chain extension, incorporation of hydrophilic groups and branching groups. At the same time, the positive properties of the aliphatic/aromatic copolyester are not achieved at the cost of the mechanical properties, which means that the mechanical properties of the inventive copolyesters are not worsened by the replacement of succinic acid by 2-methylsuccinic acid. Compared to aliphatic/aromatic copolyesters with a similar proportion of renewable raw materials, the mechanical properties are actually improved.

In the context of the present application, the feature "biodegradable" for a substance or a substance mixture is satisfied when this substance or the substance mixture, in accordance with DIN EN 13432, has a percentage of biological degradation of at least 90%.

In general, the effect of the biodegradability is that the polyesters/polyester mixtures decompose within an appropriate and detectable time interval. The degradation can be effected enzymatically, hydrolytically, oxidatively and/or by reaction of electromagnetic radiation, for example UV radiation, and be brought about predominantly by reaction of microorganisms such as bacteria, yeasts, fungi and algae. The biodegradability can be quantified, for example, by mixing polyesters with compost and storing them for a certain period. For example, according to DIN EN 13432 (referring to ISO 14855), $CO_2$-free air is allowed to flow through mature compost during composting, and this is subjected to a defined temperature program. The biodegradability is defined here via the ratio of net $CO_2$ release of the sample (after subtraction of the $CO_2$ release by the compost without sample) to the maximum $CO_2$ release of the sample (calculated from the carbon content of the sample) as the percentage of biodegradation. Biodegradable polyesters/polyester mixtures generally exhibit clear degradation phenomena after only a few days of composting, such as fungal growth, and formation of tears and holes.

Other methods for determining biodegradability are described, for example, in ASTM D 5338 and ASTM D 6400-4.

Component A1

Component A1 comprises repeat units based on at least one aliphatic dicarboxylic acid and/or an ester-forming derivative thereof, component A1 comprising 2-methylsuccinic acid and/or an ester-forming derivative thereof.

In the context of the present application, an ester-forming derivative of a dicarboxylic acid is understood to mean the corresponding di-$C_1$-$C_{10}$-alkyl ester, preferably the corresponding di-$C_1$-$C_6$-alkyl ester, such as dimethyl, diethyl, di-n-propyl, diisopropyl, di-n-butyl, diisobutyl, di-tert-butyl, di-n-pentyl, diisopentyl and di-n-hexyl esters. Anhydrides of the dicarboxylic acids can likewise be used.

This means that component A1 may comprise 2-methylsuccinic acid and/or an ester-forming derivative thereof alone, or a mixture comprising 2-methylsuccinic acid and/or an ester-forming derivative thereof with at least one further aliphatic dicarboxylic acid and/or an ester-forming derivative thereof.

Suitable further aliphatic dicarboxylic acids and/or ester-forming derivates thereof are preferably $C_4$-$C_{30}$ aliphatic dicarboxylic acids such as succinic acid, sebacic acid, azelaic acid, adipic acid and brassylic acid, more preferably $C_6$-$C_{13}$ aliphatic dicarboxylic acids or ester-forming derivatives thereof, such as sebacic acid, azelaic acid and brassylic acid.

In a preferred embodiment, the present invention relates to an inventive polyester in which component A1 comprises a mixture comprising 2-methylsuccinic acid and/or an ester-forming derivative thereof and at least one further dicarboxylic acid and/or an ester-forming derivative thereof selected from the group consisting of succinic acid, sebacic acid, azelaic acid, adipic acid and brassylic acid; more preferably component A1 comprises a mixture comprising 2-methylsuccinic acid and/or an ester-forming derivative thereof and sebacic acid and/or an ester-forming derivative thereof.

In a further preferred embodiment, the present invention relates to an inventive polyester in which component A1 comprises 2-methylsuccinic acid and/or an ester-forming derivative thereof alone or a mixture comprising 2-methylsuccinic acid and/or an ester-forming derivative with at least one further aliphatic $C_8$-$C_{13}$-dicarboxylic acid and/or an ester-forming derivative thereof. $C_8$-$C_{13}$-Dicarboxylic acids are understood to mean especially aliphatic dicarboxylic acids selected from the group consisting of sebacic acid, azelaic acid and brassylic acid, or the ester-forming derivatives thereof.

In a preferred embodiment, the inventive polyester is thus based on repeat units of at least one aliphatic dicarboxylic acid and/or an ester-forming derivative thereof as component A1, component A1 being a mixture comprising 2-methylsuccinic acid and/or an ester-forming derivative thereof and at least one further dicarboxylic acid and/or an ester-forming derivative thereof selected from the group consisting of sebacic acid, azelaic acid, adipic acid, brassylic acid and succinic acid.

In a particularly preferred embodiment, component A1 comprises a mixture comprising 2-methylsuccinic acid and/or an ester-forming derivative thereof and sebacic acid or azelaic acid and/or an ester-forming derivative thereof.

In the case when component A1 comprises a mixture comprising 2-methylsuccinic acid and/or an ester-forming derivative thereof with at least one further aliphatic dicarboxylic acid and/or an ester-forming derivative thereof, the molar proportion of repeat units based on 2-methylsuccinic acid and/or an ester-forming derivative thereof is generally 5 to 90 mol %, preferably 10 to 80 mol %, more preferably 20 to 70 mol %. The molar proportion of the at least one further aliphatic dicarboxylic acid and/or an ester-forming derivative thereof is generally 5 to 95 mol %, preferably 20 to 90 mol %, more preferably 30 to 80 mol %, where the sum total of 2-methylsuccinic acid and/or an ester-forming derivative thereof and the at least one further aliphatic dicarboxylic acid and/or an ester-forming derivative thereof is 100 mol % of component A1.

In a very particularly preferred embodiment, component A1 comprises repeat units based on a mixture comprising 5 to 90 mol %, preferably 10 to 80 mol %, more preferably 20 to 70 mol %, of repeat units based on 2-methylsuccinic acid and/or an ester-forming derivative thereof with 5 to 95 mol %, preferably 20 to 90 mol %, more preferably 30 to 80 mol %, of sebacic acid or azelaic acid and/or an ester-forming derivative thereof.

The aliphatic dicarboxylic acids mentioned are commercially available.

Succinic acid, sebacic acid, azelaic acid and brassylic acid are obtainable from renewable raw materials, for example by fermentation, or from vegetable oil, for example castor oil.

Component A2

Repeat units based on at least one aromatic dicarboxylic acid and/or an ester-forming derivative thereof are used as component A2.

Component A2 can, for example, base on repeat units based on one or more aromatic dicarboxylic acids and/or ester-forming derivatives thereof selected from the group consisting of terephthalic acid, isophthalic acid, 2,5-furanedicarboxylic acid, 2,6-naphthoic acid, 1,5-naphthoic acid and ester-forming derivatives thereof.

The aromatic dicarboxylic acids mentioned are commercially available.

2,5-Furanedicarboxylic acid can be obtained from renewable raw materials.

Component A2 preferably comprises terephthalic acid and/or an ester-forming derivative thereof. In a particularly preferred embodiment, component A2 comprises terephthalic acid and/or an ester-forming derivative thereof alone, or a mixture comprising terephthalic acid and/or an ester-forming derivative thereof and 2,5-furanedicarboxylic acid and/or an ester-forming derivative thereof.

Component B

The inventive polyester additionally comprises repeat units based on at least one diol as component B.

Preferably, component B comprises at least one diol selected from the group consisting of $C_2$-$C_8$-alkanediols and $C_5$-$C_{10}$-cycloalkanediols. More preferably, component B comprises at least one diol selected from ethylene glycol, 1,2-propanediol, 1,3-propanediol, 1,2-butanediol, 1,4-butanediol, 1,5-pentanediol, 1,6-hexanediol, cyclopentanediol, 1,4-cyclohexanediol, 1,2-cyclohexanedimethanol and 1,4-cyclohexanedimethanol.

The diols mentioned are commercially available.

In a very particularly preferred embodiment, component B comprises 1,4-butanediol, it being possible to use 1,4-butanediol alone or in a mixture with one or more further diols, preferably the aforementioned diols.

1,4-Butanediol is likewise obtainable from renewable raw materials. WO 09/024,294 discloses a biotechnological process for production of 1,4-butanediol proceeding from different carbohydrates with microorganisms from the class of the Pasteurellaceae.

Component A3

In addition to the aforementioned components A1, A2 and B, the inventive polyester may optionally comprise repeat units based on at least one sulfo-containing compound (component A3).

Preferably, component A3 comprises at least one alkali metal or alkaline earth metal salt of a sulfo-containing dicarboxylic acid and/or an ester-forming derivative thereof, particular preference being given to using at least one alkali metal salt of 5-sulfoisophthalic acid as component A3. Very particular preference is given to using the sodium salt of 5-sulfoisophthalic acid.

Component C

In addition to components A1, A2 and B, and optionally component A3, the polyester may additionally comprise repeat units based on at least one trifunctional crosslinking agent as component C1 and/or optionally at least one difunctional chain extender as component C2.

Suitable crosslinking agents C1 comprise at least 3, preferably 3 to 10, functional groups suitable for crosslinking with the carboxyl groups and/or hydroxyl groups of the polyester-forming components A1, A2, B and any A3. Suitable functional groups are preferably selected from the group consisting of isocyanate groups, isocyanurate groups, oxazoline groups, epoxide groups, carboxylic anhydride groups, hydroxyl groups, amino groups and carboxyl groups. This crosslinking agent may have at least three identical or different functional groups.

Suitable crosslinking agents C1 with at least three functional groups are, for example: tartaric acid, citric acid, malic acid; trimethylolpropane, trimethylolethane; pentaerythritol; polyether triols, glycerol, trimesic acid, trimellitic acid, trimellitic anhydride, pyromellitic acid and pyromellitic anhydride. Preference is given to polyols such as trimethylolpropane, pentaerythritol and glycerol, very particular preference being given to glycerol.

Suitable chain extenders are compounds which have two or optionally more than two, preferably two, functional groups suitable for coupling with the carboxyl groups and/or hydroxyl groups of the polyester-forming components A1, A2, B and A3. The functional groups are preferably selected from the group consisting of isocyanate groups, isocyanurate groups, oxazoline groups, carboxylic anhydride groups and epoxide groups. These functional groups in the chain extender may be the same of different.

Chain extenders having at least three functional groups can also be regarded as crosslinkers.

Examples of suitable chain extenders having two functional groups (bifunctional chain extenders) include the following compounds: aromatic diisocyanates such as tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate and xylylene diisocyanate, particular preference being given to diphenylmethane 2,2'-, 2,4'- and 4,4'-diisocyanate. Typically, the particularly preferred diisocyanates mentioned above are used in the form of mixtures. It is also possible for the diisocyanates to comprise uretdione groups in minor amounts, for example up to 5% by weight, based on the total weight of the diisocyanates, for example to cap the isocyanate groups.

In addition, aliphatic diisocyanates can be used as bifunctional chain extenders. Suitable aliphatic diisocyanates are, for example, linear or branched alkylene diisocyanates or cycloalkylene diisocyanates having 2 to 20 carbon atoms, preferably 3 to 12 carbon atoms, for example butylene 1,4-diisocyanate, hexamethylene 1,6-diisocyanate, isophorone diisocyanate and methylenebis(4-isocyanatocyclohexane). Particular preference is given to using isophorone diisocyanate and hexamethylene 1,6-diisocyanate as aliphatic diisocyanates, very particular preference being given to hexamethylene 1,6-diisocyanate.

With the aid of the crosslinking agents C1 and/or chain extenders C2, it is possible to form biodegradable polyesters with structural viscosity. The rheological characteristics of polyester melts improve; the biodegradable polyesters can be processed more easily, for example have better drawability by melt solidification to form films. The crosslinking agents C1 and chain extenders C2 lead to enhanced structural viscosity characteristics, which means that the viscosity declines to a greater degree under shear compared to polymers without components C1 and C2.

Polyester

The acid component of the inventive polyester generally has the following composition:

a) 5 to 90 mol %, preferably 10 to 80 mol %, more preferably 20 to 70 mol %, based on components A1 and A2, of component A1, and b) 10 to 95 mol %, preferably 20 to 90 mol %, more preferably 30 to 80 mol %, based on components A1 and A2, of component A2.

In addition, the inventive polyester may comprise 0 to 10 mol %, preferably 0 to 5 mol %, more preferably 0 to 3 mol %, based on the sum of components A1 and A2, of at least one sulfo-containing compound as component A3. The molar amounts of component A1 and/or A2 decrease correspondingly in the presence of component A3, such that the total amount of components A1, A2 and A3 adds up to 100 mol %.

The molar amount of repeat units based on at least one diol as component B corresponds, within narrow limits, to the sum of molar amounts of the acid component, i.e. 98 to 102 mol %.

In addition, the inventive polyester may comprise repeat units based on 0 to 3% by weight, preferably 0.05 to 2% by weight, more preferably 0.1 to 1.5% by weight, based on the total amount of components A1, A2, B and optionally A3, of at least one crosslinking agent as component C1 and/or of at least one chain extender as component C2.

Suitable components A1, A2, B, A3 and C have already been specified above.

In a very particularly preferred embodiment, the present invention relates to a polyester comprising repeat units based on
an acid component A comprising:
a) 10 to 90 mol %, preferably 10 to 80 mol %, more preferably 20 to 70 mol %, of component A1, preference being given to using, as component 1, 2-methylsuccinic acid and/or an ester-forming derivative thereof alone or a mixture comprising 2-methylsuccinic acid and/or an ester-forming derivative thereof and at least one further dicarboxylic acid and/or an ester-forming derivative thereof selected from the group consisting of sebacic aid, azelaic acid, adipic acid and brassylic acid, preferably sebacic acid;
b) 10 to 90 mol %, preferably 20 to 80 mol %, more preferably 30 to 80 mol %, of component A2, preference being given to using, as component A2, terephthalic acid and/or an ester-forming derivative thereof,
c) 0 to 10 mol %, preferably 0 to 5 mol %, more preferably 0 to 3 mol %, of component A3, preference being given to using a sodium salt of 5-sulfo-isophthalic acid as component A3,
d) 98 to 102 mol %, based on acid component A, of component B, preference being given to using 1,4-butanediol as component B, and
e) 0 to 3% by weight, preferably 0.05 to 2% by weight, more preferably 0.1 to 1.5% by weight, of component C1 and/or C2, particular preference being given to using glycerol as component C1.

The inventive polyesters generally have a number-average molecular weight $M_n$ of 5000 to 100 000 g/mol, preferably 10 000 to 60 000 g/mol, more preferably 20 000 to 40 000 g/mol, determined by means of GPC on PMMA standards in hexafluoroisopropanol. The weight-average molecular weight $M_w$ is generally 30 000 to 300 000 g/mol, preferably 60 000 to 200 000 g/mol, more preferably 80 000 to 150 000 g/mol. The polydispersity index $M_w/M_n$ is generally 1 to 6, preferably 2 to 4.

The inventive aliphatic-aromatic polyesters are generally random copolyesters, which means that the incorporation of the aromatic and aliphatic diacid units is purely random. The distribution and length of the individual blocks can be calculated according to B. Vollmert, Grundriss der makromolekularen Chemie [Basics of Macromolecular Chemistry]. As described by Witt et al. in J. Environ. Pol. Degradation, volume 4, No. 1 (1996), p. 9, the degradation of aromatic model oligomers where n≥3 in compost is normally very slow. In the case of aliphatic-aromatic polyesters, however, block structures too are rapidly degraded.

The inventive polyesters generally have an acid number measured to DIN EN 12634 of <1.0 mg KOH/g.

The inventive polyesters generally have a melt volume rate (MVR) to ISO 1133 of 0.5 to 30 cm$^3$/10 min (190° C., weight 2.16 kg).

The viscosity number of the inventive polyesters to DIN 53728 is generally at least 80 cm$^3$/g, preferably 160 to 250 cm$^3$/g, more preferably 170 to 220 cm$^3$/g.

The inventive polyesters are generally prepared by reacting components A1, A2 and B, and optionally components A3 and optionally C1 and C2, with one another.

Preparation of the Inventive Polyesters

The inventive polyesters are preferably prepared in a two-stage reaction cascade (as described, for example, in WO 2009/127555 and WO 2009/127556).

Typically, this involves first reacting the dicarboxylic acids or the ester-forming derivatives of the dicarboxylic acids (components A1 and A2) together with the at least one diol (component B) in the presence of a transesterification catalyst to give a prepolyester. The transesterification catalysts used are generally zinc catalysts, aluminum catalysts or titanium catalysts, preference being given to titanium catalysts. Suitable titanium catalysts are, for example, tetra(isopropyl) orthotitanate and tetrabutyl orthotitanate (TBOT). The titanium catalysts have the advantage over the tin catalysts, antimony catalysts, cobalt catalysts and lead catalysts frequently used in the prior art that residual amounts of the catalysts or conversion product of the catalyst remaining in the product are less toxic. This fact is important in the case of the inventive biodegradable polyesters, since they get into the environment directly, for example, as composting bags or mulch films.

The aforementioned dicarboxylic acids and/or ester-forming derivatives thereof (components A1 and A2) are first condensed in the presence of at least one diol (component B) and optionally in the presence of crosslinker C1, generally in the presence of the transesterification catalyst. Typically, a molar excess of diol is used in relation to the dicarboxylic acids (sum of components A1 and A2). Subsequently, a melt of the resulting prepolyester is condensed, generally at an internal temperature of 200 to 250° C., within typically 3 to 6 hours, with distillative removal of the diol released. This is generally done at a pressure below standard pressure.

The resulting polyesters can subsequently optionally be chain-extended and/or crosslinked by processes known to those skilled in the art with addition of component C2. Suitable processes are described in WO 96/15173 and EP-A 0 488 617.

The chain extension is effected generally at reaction temperatures of 220 to 270° C., preferably 230 to 250° C., typically at standard pressure or elevated pressure. The residence times in the continuous process are generally 2 to 30 minutes.

A suitable continuous process for preparing the inventive polyesters is described, for example, in WO 2009/127556.

In addition to the above-described continuous process, the inventive polyesters can also be prepared in a batchwise process. For this purpose, components A1, A2, B, optionally A3 and optionally C1 can be mixed in any desired metering sequence and condensed to a prepolyester. A polyester with the desired viscosity is prepared from the prepolyester— optionally with the aid of at least one chain extender C2.

The inventive polyesters have excellent processability. They are especially notable for outstanding hydrolysis stability.

Additives

The inventive biodegradable polyesters, or the polyester mixtures specified hereinafter, may comprise further ingredients. Suitable ingredients are known to those skilled in the art.

For example, the inventive biodegradable polyesters or the polyester mixtures specified hereinafter may comprise additives customary in polymer technology, such as stabilizers; nucleating agents; neutralizing agents; lubricants and release agents such as stearates (especially calcium stearate); plasticizers such as citric esters (especially acetyl tributylcitrate), glyceryl esters such as triacetylglycerol or ethylene glycol derivatives, surfactants such as polysorbates, palmitates or laurates; waxes such as beeswax or beeswax esters; antistats; UV absorbers; UV stabilizers; antifogging agents and/or dyes.

The additives can be used generally in amounts of 0 to 5% by weight, preferably 0.1 to 2% by weight, based on the total amount of the inventive polyester. Plasticizers may be present in the inventive polyesters or the polyester mixtures specified hereinafter in 0.1 to 10% by weight, based on the amount of the inventive polyester.

Polyester Mixtures

The inventive biodegradable polyesters are suitable for preparation of preferably biodegradable polymer mixtures. Suitable polymer mixtures of biodegradable polyesters are known in principle to those skilled in the art.

Preference is given to polyester mixtures comprising
i) at least one inventive polyester;
ii) optionally at least one organic and/or inorganic filler and/or nanoparticulate filler;
iii) optionally at least one polymer selected from the group consisting of polylactic acid, polycaprolactone, polyhydroxyalkanoate, polyalkylene carbonate, chitosan, gluten and one or more polyesters based on aliphatic diols and aliphatic and/or aromatic dicarboxylic acids;
iv) optionally at least one compatibilizer;
where at least one of the components specified in ii) or iii) is present in the polyester mixtures.

In a particularly preferred embodiment, the present invention relates to biodegradable polyester mixtures comprising
i) 5 to 95% by weight, preferably 20 to 80% by weight, based on components i and ii, of at least one inventive polyester;
ii) 5 to 95% by weight, preferably 20 to 80% by weight, based on components i and ii, of at least one polymer selected from the group consisting of polylactic acid, polycaprolactone, polyhydroxyalkanoate, polyalkylene carbonate, chitosan, gluten and one or more polyesters based on aliphatic diols and aliphatic and/or aromatic dicarboxylic acids;
iii) 0 to 90% by weight, preferably 1 to 80% by weight and more preferably 2 to 50% by weight, based on components i and ii, of at least one organic and/or inorganic filler and/or nanoparticulate filler; and
iv) 0 to 2% by weight, preferably 0.05 to 1.5% by weight, based on components i and ii, of at least one compatibilizer.

ii)
Among the polymers mentioned under ii), polylactic acid is suitable with preference. Polylactic acid with the following profile of properties is used with particular preference:
a melt volume rate (MVR at 190° C. and 2.16 kg to ISO 1133) of 0.5 to 30, preferably 2 to 18, ml/10 minutes
a melting point of <240° C.;
a glass transition temperature ($T_g$) of >55° C.;
a water content of <1000 ppm;
a residual monomer content (lactite) of <0.3%;
a molecular weight of >80 000 daltons.

Preferred polylactic acids are, for example, NatureWorks® 2003, 3001, 3051, 3251, 4020, 4032 or 4043D (polylactic acid from NatureWorks®, Naarden, the Netherlands, and Blair, Nebr., USA).

A suitable polycaprolactone is, for example, polycaprolactone from Daicel, which is marketed under the Placcel® product name.

Suitable polyhydroxyalkanoates are, for example, poly-4-hydroxybutyrate and poly-3-hydroxybutyrate. Additionally suitable are the copolyesters of the aforementioned hydroxybutyrates with 3-hydroxyvalerates or 3-hydroxyhexanoates. Poly-3-hydroxybutyrate-co-4-hydroxybutyrate is known, for example, from metabolics and is sold under the Mirel® brand name. Poly-3-hydroxybutyrate-co-3-hydroxyhexanoate is known, for example, from P & G or Kaneka. Poly-3-hydroxybutyrate is sold, for example, by PHB Industrial under the Biocycle® brand name, and by Tianan under the Inmat® name.

Suitable polyhydroxyalkanoates generally have a molecular weight $M_w$ of 100 000 to 1 000 000 g/mol, preferably of 300 000 to 600 000 g/mol.

Suitable polyalkylene carbonates are, for example, polyethylene carbonate and polypropylene carbonate.

Suitable polyesters based on aliphatic diols and aliphatic and/or aromatic dicarboxylic acids are, in the context of the present application, also polyester derivatives such as polyether esters, polyester amides or polyether ester amides. Examples of suitable polyesters based on aliphatic diols and aliphatic and/or aliphatic/aromatic dicarboxylic acids are, for example, linear, non-chain-extended polyesters as described in WO 92/09654. Particularly suitable polyesters are those formed from butanediol, terephthalic acid and aliphatic $C_6-C_{18}$-dicarboxylic acids such as adipic acid, suberic acid, acelaic acid, sebacic acid and brassylic acid. Such polyesters are described, for example, in WO 2006/097353, WO 2006/097354, WO 2006/097355 and WO 2006/097356. Preference is given to using chain-extended and/or branched polyesters based on aliphatic diols and aliphatic and/or aliphatic/aromatic dicarboxylic acids. These are described, for example, in WO 96/15173, WO 96/15174, WO 96/15175, WO 96/15176, WO 96/21689, WO 96/21690, WO 96/21691, WO 96/21692, WO 96/25446, WO 96/25448 and WO 98/12242. It is likewise possible to use mixtures of different polyesters based on aliphatic diols and aliphatic or aliphatic/aromatic dicarboxylic acids. Further preferred polyesters based on aliphatic diols and aliphatic or aliphatic/aromatic dicarboxylic acids are Ecoflex® (BASF SE), Eastar®Bio and Origo-Bi® (Novamont).

iii)
Suitable organic fillers are preferably selected from the group consisting of native or plasticized starch, native or plasticized amylose, natural fibers, wood floor, comminuted cork, ground bark, nutshells, ground presscake (vegetable oil refinery), dry production residues from the fermentation or distillation of drinks, such as beer, brewed lemonades (e.g. Bionade), wine or sake.

Suitable inorganic fillers are, for example, selected from the group consisting of chalk, graphite, gypsum, conductive black, iron oxide, calcium chloride, dolomite, kaolin, silica (quartz), sodium carbonate, titanium dioxide, silicate, wollastonite, mica, montmorillonite, talc, glass fibers, mineral fibers, carbon fibers, aramid fibers and potassium titanate fibers.

Suitable nanoparticulate fillers are, for example, selected from the group of the sheet silicates (montmorillonites) or silicas with a mean particle diameter of <500 nm.

Starch and amylose may be native, i.e. non-thermoplasticized, or may have been thermoplasticized with plasticizers such as glycerol or sorbitol (see EP-A 0 539 541, EP-A 0 575 349, EP-A 0 652 910). In addition, modified starches (e.g. cationically and/or anionically modified, or carboxymethyl starches) may be used in native form or having been thermoplasticized with plasticizers such as glycerol or sorbitol.

Natural fibers are generally understood to mean cellulose fibers, hemp fibers, sisal, kenaf, jute, flax, abacca, coconut fibers or regenerated cellulose fibers (rayon) such as Cordenka fibers.

Preferred fibrous fillers are glass fibers, carbon fibers, aramid fibers, potassium titanate fibers and natural fibers, particular preference being given to glass fibers in the form of E glass. These can be used in the form of rovings or especially as chopped glass in the standard commercial forms. These fibers generally have a diameter of 3 to 30 μm, preferably 6 to 20 μm, more preferably 8 to 15 μm. The fiber length in the polymer mixtures is generally 20 μm to 1000 μm, preferably 180 to 500 μm and more preferably 200 to 400 μm.

For better compatibility with the inventive polyester, the fibrous fillers may have been surface pretreated, for example with a silane compound.

iv)

Suitable compatibilizers which serve especially for compatibilization between the inventive polyester and the polymers mentioned under ii) are, for example, carboxylic anhydrides such as maleic anhydride, epoxy-containing copolymers based on styrene, acrylic esters and/or methacrylic esters or peroxides. The epoxy-bearing units are preferably glycidyl(meth)acrylate. Epoxy-containing copolymers of the abovementioned type are sold, for example, by BASF Resins B. V. under the Joncryl®ABR brand. Peroxides are sold, for example, by AkzoNobel under the "Trigonox" name. A particularly suitable compatibilizer is, for example, "Joncryl®ADR4368" or "Trigonox 301".

Use

The inventive polyesters or the inventive polyester mixtures can be used for production of moldings, coating compositions, fibers, films, foams, adhesives. In addition, the inventive polyesters or polyester mixtures are suitable for use as mulch films, as packaging material for seeds and foods, as a substrate in adhesive films, baby pants, bags, bed sheets, bottles, boxes, dust bags, labels, cushion covers, protective clothing, hygiene articles, pocket tissues and toys.

A particularly preferred field of use relates to the use of the inventive polyesters and polyester mixtures for production of films and film strips for meshing and fabrics, tubular films, chill roll films with or without alignment in a further process step, with or without metallization or $SiO_x$ coatings.

More particularly, the inventive polyesters and polyester mixtures can be processed further to give tubular films, shrink films and stretch films. Possible applications are basal fold bags, lateral seam bags, carrier bags with a hole grip, shrink labels or vest-type carrier bags, inliners, heavy-duty bags, freezer bags, composting bags, agricultural films (mulch films), film bags for packaging of foods, peelable closure films—transparent or opaque—weldable closure films—transparent or opaque, sausage skins, salad films, freshness retention films (stretch films), for example for fruit, vegetables, meat and fish, stretch films for wrapping of pallets, films for nets, packaging films, for example for snacks, chocolate bars and muesli bars, peelable lid films, for example for dairy packaging (yoghurt, cream, etc.), fruit and vegetables, semirigid packaging, for example for smoked sausage and cheese.

Due to their barrier properties with respect to oxygen and aromas, which are excellent for biodegradable films, the inventive polyesters and polyester mixtures are especially suitable for packaging of meat, poultry, meat products, processed meat, sausages, smoked sausage, seafood, fish, crab meat, cheese, cheese products, desserts, pies, for example with meat, fish, poultry and/or tomato filling, pastes and bread spreads; bread, cakes, other bakery products; fruit, fruit juices, vegetables, tomato puree salads; animal food; pharmaceutical products; coffee, coffee-like products; milk or cocoa powder, coffee whitener, baby food, dry foods; jams and jellies; bread spreads, chocolate cream; and ready meals. Further information for suitable applications is given, for example, in "Food Processing Handbook", James G. Brennan, Wiley-VCH, 2005.

The inventive polymer mixtures have excellent tear resistance (to ENISO 6383-2: 2004) after extrusion to give single- or multi-ply tubular films, blow films or pressed films. Tear propagation resistance is a very important product property, in particular in the area of thin (tubular) films, for example for biowaste bags or thin-wall carrier bags (for example vest-type carrier bags, fruit bags). In addition, it is of particular importance in the case of mulch films in the agricultural sector.

Due to the rapid biodegradability and the outstanding mechanical properties, it is possible to implement film applications which still meet the standards of compostability even in relative high film thicknesses (>240 μm).

The inventive biodegradable polyesters and polyester mixtures additionally have very good adhesion properties. As a result, they are of excellent suitability for coating of paper, for example for paper cups and paper plates. For the production thereof, both extrusion coating and lamination processes are suitable. A combination of these processes, or coating by spraying, with a coating bar or by immersion, is also conceivable.

The examples which follow provide additional illustration of the invention.

EXAMPLES

General Synthesis Methods for Inventive Examples 1 to 10 and Comparative Examples 1 to 9

The amounts of dimethyl terephthalate (DMT), 1,4-butanediol (1,4-BDO), tetrabutyl orthotitanate (TBOT) and glycerol specified in table 1 or 2 are initially charged in a glass flask with stirrer and distillation apparatus. While stirring, the mixture is heated and the methanol released is distilled off at temperatures up to approx. 180° C. After the distillation has ended, the amount of the particular aliphatic dicarboxylic acids (2-methylsuccinic acid (2-MeSA), succinic acid, adipic acid, sebacic acid) specified in table 1 or 2 are added, the internal temperature is gradually raised to 220° C. and the water released is distilled off. After the distillation has ended, vacuum is applied stepwise, the internal temperature is increased up to 265° C. and condensation is continued with the best possible vacuum (<1 mbar) for approx. 2 to 3 hours, until a high-viscosity melt is present. This is poured out and analyzed by means of DSC, and the viscosity number and in some cases the molar mass distribution are determined by GPC.

TABLE 1

Examples 1 to 10 (inventive)

| Example No. | DMT/g | 1,4-BDO/g | TBOT/g | Glycerol/g | 2-MeSA/g | Succinic acid/g | Adipic acid/g | Sebacic acid/g |
|---|---|---|---|---|---|---|---|---|
| 1 | 91.3 | 117.2 | 0.2 | 0.2 | 70.0 | — | — | — |
| 2 | 91.3 | 117.2 | 0.2 | 0.2 | 70.0 | — | — | — |
| 3 | 91.3 | 117.2 | 0.2 | 0.2 | 75.3 | — | — | — |
| 4 | 91.3 | 117.2 | 0.2 | 0.2 | 35.0 | 31.3 | — | — |
| 5 | 91.3 | 117.2 | 0.2 | 0.2 | 52.2 | — | 19.4 | — |
| 6 | 91.3 | 117.2 | 0.2 | 0.2 | 35.0 | — | 38.7 | — |
| 7 | 91.3 | 117.2 | 0.2 | 0.2 | 17.5 | — | 58.1 | — |
| 8 | 91.3 | 117.2 | 0.2 | 0.2 | 52.5 | — | — | 26.8 |
| 9 | 91.3 | 117.2 | 0.2 | 0.2 | 52.5 | — | — | 26.8 |
| 10 | 91.3 | 117.2 | 0.2 | 0.2 | 35.0 | — | — | 53.6 |

TABLE 2

Comparative examples 1 to 9

| Comparative examples | DMT/g | 1,4-BDO/g | TBOT/g | Glycerol/g | 2-MeSA/g | Succinic acid/g | Adipic acid/g | Sebacic acid/g |
|---|---|---|---|---|---|---|---|---|
| 1 | 91.3 | 117.2 | 0.2 | 0.2 | — | 62.6 | — | — |
| 2 | 83.5 | 117.2 | 0.2 | 0.2 | — | 67.3 | — | — |
| 3 | 91.3 | 117.2 | 0.2 | 0.2 | — | 50.8 | — | 20.2 |
| 4 | 91.3 | 117.2 | 0.2 | 0.2 | — | 39.0 | 29.2 | — |
| 5 | 91.3 | 117.2 | 0.2 | 0.2 | — | 50.8 | 14.8 | — |
| 6 | 91.3 | 117.2 | 0.2 | 0.2 | — | 39.0 | — | 40.5 |
| 7 | 91.3 | 117.2 | 0.2 | 0.2 | — | 31.3 | — | 53.6 |
| 8 | 91.3 | 117.2 | 0.2 | 0.2 | — | — | 77.5 | — |
| 9 | 83.5 | 117.2 | 0.2 | 0.2 | — | — | 83.3 | — |

Application-Related Measurements:

The molecular weights Mn and Mw of the aliphatic/aromatic polyesters are determined to DIN 55672-1. Eluent: hexafluoroisopropanol (HFIP)+0.05% by weight trifluoroacetic acid K salt; the calibration is effected with polymethyl methacrylate standards in narrow distribution.

The viscosity numbers are determined to DIN 53728 part 3, Jan. 3, 1985, capillary viscometry. An Ubbelohde microviscometer is used, M II type. The solvent used is the mixture: phenol/o-dichlorobenzene in a weight ratio of 50/50.

The melt volume index (MVR) [cm³/10 min] is measured to DIN 53735 or ISO 1133 at the temperature and load specified.

DSC measurements are conducted on a DSCT instrument from Mettler-Toledo (DSC 30 type). Approx. 15 mg of sample are weighed in and analyzed with the following temperature profile:

1. 1st heating curve: from −60° C. to 200° C. at 20° C./min
2. Hold at 200° C. for 1 min
3. 1st cooling curve from 200° C. to −60° C. at 20° C./min
4. Hold at −60° C. for 1 min
5. 2nd heating curve from −60° C. to 200° C. at 20° C./min The following temperatures are determined from the DSC measurements:

$T_c$: Crystallization temperature, defined as the maximum of the crystallization peaks of the first cooling curve.

$T_{cc}$: Cold crystallization temperature, defined as the maximum of the crystallization peak in the approximate temperature range of 25-35° C. during the second heating curve.

$T_g$: Glass transition temperature, determined from the second heating curve.

$T_{mp,max}$: Melting temperature, defined as the maximum of the melting peak during the second heating curve in the temperature range of approx. 100-150° C.

TABLE 3

Analysis of examples 1 to 10 (inventive)

| Example No. | Viscosity number/ml/g | $M_n$ | $M_w$ | $T_c$/° C. | $T_{cc}$/° C. | $T_g$/° C. | $T_{mp,max}$/° C. |
|---|---|---|---|---|---|---|---|
| 1 | 146 | 25 200 | 95 400 | — | 29 | −10 | 124 |
| 2 | 143 | 26 400 | 91 600 | — | 29 | −11 | 125 |
| 3 | 145 | — | — | — | 34 | −12 | 114 |
| 4 | 143 | — | — | — | 28 | −10 | 125 |
| 5 | 151 | — | — | 21 | 20* | −16 | 123 |
| 6 | 154 | — | — | 28 | — | −21 | 125 |
| 7 | 161 | — | — | 36 | — | −24 | 124 |
| 8 | 149 | — | — | 42 | — | −20 | 120 |
| 9 | 139 | — | — | 54 | — | −19 | 123 |
| 10 | 152 | — | — | 23 | — | −28 | 118 |

*only very weak cold crystallization

As can be inferred from the viscosity numbers and molecular weights of illustrated inventions 1 to 10 compared to comparative examples 1 to 9, it is possible with 2-methylsuccinic acid to synthesize aliphatic-aromatic polyesters with an equally high molecular weight.

In applications in which a lower crystallization rate could be advantageous, this can be regulated very efficiently through the 2-methylsuccinic acid content in the total amount of the aliphatic dicarboxylic acids. For instance, inventive examples 5 to 10 exhibit a distinct increase in crystallization rate compared to inventive examples 1 to 4. An increased crystallization rate is desirable, for example, in the case of processing to, for example, blown films, extrusion films, possibly with subsequently thermoformed moldings, injection-molded articles, paper coatings.

TABLE 4

Analysis of comparative examples 1-9

| Example No. | Viscosity number/ ml/g | $M_n$ | $M_w$ | $T_c/°C$ | $T_g/°C$ | $T_{mp}/°C$ |
|---|---|---|---|---|---|---|
| 1 | 141 | 27 400 | 87 000 | 48.0 | −13.8 | 126.4 |
| 2 | 141 | — | — | * | −12.5 | 116.0 |
| 3 | 138 | — | — | 28.4 | −19.4 | 124.3 |
| 4 | 147 | — | — | 51.2 | −19.3 | 126.0 |
| 5 | 139 | — | — | 45.5 | −15.4 | 125.8 |
| 6 | 154 | — | — | 26.6 | −24.2 | 120.2 |
| 7 | 137 | 26 600 | 80 200 | 26.3 | −32 | 120 |
| 8 | 152 | 27 700 | 89 600 | 57.8 | −29 | 123 |
| 9 | 155 | — | — | — | −31.4 | 112.3 |

* does not crystallize

TABLE 5

Hydrolysis stability of selected examples and comparative examples:

| | Example No. (inventive) | | | Comparative example No. | |
|---|---|---|---|---|---|
| Example No. | 4 | 6 | 8 | 1 | 8 |
| Day 0 | 140 | 148 | 144 | 134 | 155 |
| Day 3 | 131 | 143 | (167) | 126 | 149 |
| Day 6 | 116 | 136 | 127 | 111 | 133 |
| Day 12 | 102 | 121 | 109 | 88 | 112 |
| Day 20 | 87 | 106 | 97 | 68 | 90 |
| ΔVN (day 20 minus day 0) | 53 | 42 | 47 | 66 | 65 |
| Rating of hydrolysis stability: | + | ++ | ++ | − | − |

The hydrolysis stability of some selected examples and comparative examples is tested by storing pressed films produced therefrom at 70° C. in dist. water. The decrease in the chain length of the polyesters is monitored by the decrease in the viscosity number over 20 days. It is clear from table 5 that inventive examples 4, 6 and 8 have a much smaller decrease in the viscosity number and hence a much higher hydrolysis stability than comparative examples 1 and 8.

Example 11

131.2 kg of dimethyl terephthalate, 151 kg of 1,4-butanediol, 0.3 kg of glycerol and 0.100 kg of tetrabutyl orthotitanate (TBOT) are initially charged in a stirred tank. While stirring, the mixture is heated to an internal temperature of approx. 180° C. and the methanol which forms is distilled off completely. After methanol distillation has ended, a molten mixture of 60.6 kg of sebacic acid and 39.6 kg of 2-methylsuccinic acid is added and the internal temperature is increased stepwise to 200° C. After the water distillation has abated, vacuum is applied and the temperature is increased to internal temperature approx. 255° C., such that not only water but ultimately also the excess of 1,4-butanediol is distilled off. The polycondensation is completed at a final vacuum of approx. 9 mbar for a further 2.5 h. Then the mixture is cooled and the polyester is chain-extended continuously by addition of approx. 0.9% hexamethylene diisocyanate at a temperature of approx. 220-230° C.

The analysis gives a viscosity number of 163 and an MVR of 4.8 cm³/10 min (190° C./2.16 kg).

Film Processing:

On a monolayer blown film plant with a blowing head of diameter 8 cm, a mixture of 95% by weight of polyester from example 11, 4% by weight of Ecoflex® AB1 batch (40% by weight of polybutylene terephthalate-co-adipate and 60% by weight of chalk, BASF SE) and 1% by weight of Ecoflex® SL1 batch (90% by weight of polybutylene terephthalate-co-adipate and 10% by weight of chalk, BASF SE) can be processed at a blowing ratio of 3.5:1 without any problem to give films with a thickness of 100 or 30 micrometers, without blocking. The die temperature at the blowing head is approx. 171° C.

Biodegradability Test of Example 11:

The film of thickness 100 micrometers is tested qualitatively to EN13432 with regard to the disintegration thereof in compost, and meets the requirements of EN13432 after the test period has elapsed. In addition, film pieces of the film of thickness 30 micrometers are buried at 58° C. for 6 months in moistened compost (fresh compost from Kompostierwerk Frankenthal). After 180 days, no residues of the film pieces can be found any longer, which demonstrates the biodegradability of polyester 11.

The invention claimed is:

1. A polyester comprising repeat units based on
  a) at least one aliphatic dicarboxylic acid and/or an ester-forming derivative thereof as component A1,
  b) at least one aromatic dicarboxylic acid and/or an ester-forming derivative thereof as component A2,
  c) at least one diol as component B,
  d) optionally at least one sulfo-containing compound as component A3,
  e) optionally at least one trifunctional crosslinking agent as component C1 and/or at least one difunctional chain extender as component C2,
  wherein component A1 comprises 2-methylsuccinic acid or an ester-forming derivative thereof, and
  wherein the chain extenders C2 used are compounds which have two or optionally more functional groups suitable for coupling with the carboxyl groups and/or hydroxyl groups of the polyester-forming components A1, A2, B and A3, where the functional groups in the chain extender may be the same or different.

2. The polyester according to claim 1, wherein component A1 comprises a mixture comprising 2-methylsuccinic acid and/or an ester-forming derivative thereof and at least one further dicarboxylic acid and/or an ester-forming derivative thereof selected from the group consisting of succinic acid, sebacic acid, azelaic acid, adipic acid and brassylic acid.

3. The polyester according to claim 1, wherein component A1 comprises 2-methylsuccinic acid and/or an ester-forming derivative thereof alone or a mixture comprising 2-methylsuccinic acid and/or an ester-forming derivative with at least one further aliphatic $C_8$-$C_{13}$-dicarboxylic acid and/or an ester-forming derivative thereof.

4. The polyester according to claim 1, wherein component A2 comprises terephthalic acid and/or an ester-forming derivative thereof.

5. The polyester according to claim 4, wherein component A2 comprises terephthalic acid and/or an ester-forming derivative thereof alone or a mixture comprising terephthalic acid and/or an ester-forming derivative thereof and at least one aromatic dicarboxylic acid and/or an ester-forming derivative thereof based on renewable raw materials.

6. The polyester according to claim 1, wherein component B comprises at least one diol selected from the group consisting of $C_2$-$C_8$-alkanediols and $C_5$-$C_{10}$-cycloalkanediols.

7. The polyester according to claim 6, wherein component B comprises at least one diol selected from ethylene glycol, 1,2-propanediol, 1,3-propanediol, 1,2-butanediol, 1,4-butanediol, 1,5-pentanediol, 1,6-hexanediol, cyclopentanediol, 1,4-cyclohexanediol, 1,2-cyclohexanedimethanol and 1,4-cyclohexanedimethanol.

8. The polyester according to claim 1, wherein component A3 comprises at least one alkali metal or alkaline earth metal salt of a sulfo-containing dicarboxylic acid and/or the ester-forming derivative thereof.

9. The polyester according to claim 1, wherein the crosslinking agent C1 used is at least one crosslinking agent comprising at least 3 functional groups suitable for crosslinking with the carboxyl groups and/or hydroxyl groups of the polyester-forming components A1, A2, B and optionally A3, where the crosslinking agents may have at least three identical or different functional groups.

10. The polyester according to claim 1, comprising repeat units based on:
   an acid component A comprising:
   a) 10 to 90 mol % of component A1;
   b) 10 to 90 mol % of component A2;
   c) 0 to 10 mol % of component A3;
   d) 98 to 102 mol %, based on acid component A, of component B;
   e) 0.05 to 3% by weight of component C2 and optionally C1, based on the total amount of components A1, A2, B, and optionally A3.

11. The polyester according to claim 1, wherein the polyester has a number-average molecular weight $M_n$ of 5000 to 100 000 g/mol, determined by means of GPC on PMMA standards in hexafluoroisopropanol.

12. A process for preparing a polyester according to claim 1, which comprises reacting components A1, A2, B, and C2, and optionally components A3 and C1, with one another.

13. A mixture comprising at least one polyester according to claim 1 and at least one of the following components:
   i) at least one inventive polyester;
   ii) optionally at least one organic and/or inorganic filler and/or nanoparticulate filler;
   iii) optionally at least one polymer selected from the group consisting of polylactic acid, polycaprolactone, polyhydroxyalkanoate, polyalkylene carbonate, starch, chitosan, gluten and one or more polyesters based on aliphatic diols and aliphatic dicarboxylic acids;
   iv) optionally at least one compatibilizer;
   where at least one of the components specified in ii) or iii) is present in the polyester mixtures.

14. Moldings, coating compositions, fibers, films, foams, adhesives, mulch films, packaging material for seeds and foods, a substrate in adhesive films, baby pants, bags, bed sheets, bottles, boxes, dust bags, labels, cushion covers, protective clothing, hygiene articles, pocket tissues and toys comprising a polyester according to claim 1.

15. Moldings, coating compositions, fibers, films, foams, adhesives, mulch films, packaging material for seeds and foods, a substrate in adhesive films, baby pants, bags, bed sheets, bottles, boxes, dust bags, labels, cushion covers, protective clothing, hygiene articles, pocket tissues and toys comprising a polyester mixture according to claim 13.

* * * * *